United States Patent
Lehmann et al.

(10) Patent No.: US 8,210,598 B2
(45) Date of Patent: Jul. 3, 2012

(54) WIND BLOCKER ARRANGEMENT

(75) Inventors: Peter Lehmann, Bad Liebenzell (DE);
Uwe Skrzypek, Moensheim (DE);
Engelbert Wolpert, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/740,660

(22) PCT Filed: Sep. 19, 2008

(86) PCT No.: PCT/EP2008/007858
§ 371 (c)(1),
(2), (4) Date: Jul. 15, 2010

(87) PCT Pub. No.: WO2009/056195
PCT Pub. Date: May 7, 2009

(65) Prior Publication Data
US 2010/0289294 A1    Nov. 18, 2010

(30) Foreign Application Priority Data
Oct. 31, 2007   (DE) .......................... 10 2007 051 987

(51) Int. Cl.
*B60J 7/22* (2006.01)
(52) U.S. Cl. ........................................ 296/180.1; 296/85
(58) Field of Classification Search ............... 296/180.1, 296/85
See application file for complete search history.

(56) References Cited

U.S. PATENT DOCUMENTS

| | | | |
|---|---|---|---|
| 4,836,263 A | 6/1989 | Ament | |
| 5,941,593 A * | 8/1999 | McCann | 296/136.1 |
| 6,030,027 A | 2/2000 | Graf | |
| 7,699,381 B2 * | 4/2010 | Goetz et al. | 296/180.1 |
| 2009/0284039 A1* | 11/2009 | Alacqua et al. | 296/97.4 |

FOREIGN PATENT DOCUMENTS

| | | |
|---|---|---|
| DE | 36 12 165 A1 | 10/1987 |
| DE | 41 19 529 A1 | 12/1992 |
| DE | 43 15 139 C2 | 11/1993 |
| DE | 44 05 707 C2 | 8/1995 |
| DE | 197 25 217 C1 | 7/1998 |
| DE | 197 08 156 C2 | 9/1998 |
| DE | 102 39 200 A1 | 3/2004 |
| DE | 10 2005 029 696 A1 | 12/2006 |

OTHER PUBLICATIONS

International Search Report (PCT/ISA/210) dated Jan. 8, 2009 with partial English translation, including Forms PCT/ISA/220 and PCT/ISA/237 (Fourteen (14) pages).

* cited by examiner

*Primary Examiner* — Dennis Pedder
(74) *Attorney, Agent, or Firm* — Crowell & Moring LLP

(57) ABSTRACT

The present invention relates to a wind blocker arrangement (1) for a personal vehicle embodied as a cabriolet, having a roller device (5) comprising a shaft (12) and a material web (7) that may be rolled onto the shaft (12), having a bow (8) to which the material web (7) is attached and by means of which the material web (7) may be unwound from the shaft (12), and having two lateral arms (9) that, when the material web (7) is extended, are disposed in the region of the lateral edges (14) of the material web (7) and that are pivotable transversely to the rotational axis (13) of the shaft (12).

A particularly compact and comfortable construction may be achieved if the arms (9) are drive-coupled to the bow (8) such that the arms (9) pivoting open causes the bow (8) to pull out the material web (7).

10 Claims, 5 Drawing Sheets

(Shaft 12 Remains Stationary)

WIND BLOCKER ARRANGEMENT

This application is a national stage of PCT International Application No. PCT/EP2008/007858, filed Sep. 19, 2008, which claims priority under 35 U.S.C. §119 to German Patent Application No. 10 2007 051 987.9, filed Oct. 31, 2007, the entire disclosure of which is herein expressly incorporated by reference.

BACKGROUND AND SUMMARY OF THE INVENTION

The present invention relates to a wind blocker arrangement for a convertible passenger motor vehicle.

When a convertible vehicle is driven with the top down (the roof open), the air displaced upwards over the windscreen and flowing over the passenger space causes a negative pressure in the passenger space. With raised side window panes, this mainly leads to air flowing in from the rear, which leads to uncomfortable draft occurrences in the neck, nape and head region, and to strong hair swirls. These backflows can be reduced considerably by a wind blocker, which extends in the passenger space behind the occupants in a transverse vehicle plane.

German patent document DE 43 15 139 C2 discloses a wind blocker arrangement which has two roller devices, which respectively have a shaft and a material web which can be rolled onto the shaft. A bow is additionally provided for each roller device, to which the material web is fastened and with which the material web can be unwound from the shaft. Furthermore, two lateral arms are provided for each roller device, which arms are arranged in the region of lateral edges of the material web when the material web is extended, and which are pivotable transversely to the rotational axis of the shaft.

With the known wind blocker arrangement, the side arms overlap the bow in the rolled-up state of the material web, which can be unwound from the shaft by pulling at the bow. The arms are at the same time displaced laterally thereby, and the bow ends glide off along the arms. The free ends of the arms abut the bow ends in the extended end position of the material web. This known wind blocker arrangement is accommodated in a container, which can be mounted to the vehicle. When the wind blocker is not needed, (for example when driving with a closed roof), the known wind blocker arrangement forms a disturbing contour in that the container extends transversely in the vehicle interior, even when the material webs are rolled up.

German patent document DE 44 05 707 C2 discloses a further wind blocker arrangement, where a material web can be raised with the help of at least one gas bag, to which the material web is fastened. The respective gas bag thereby forms at least a part of a lateral limitation of the material web. The flow forces occurring during the drive operation are however comparatively large, while the material web positioned with only the at least one gas bag forms a comparatively unstable wind blocker.

German patent document DE 197 08 156 C2 discloses a further wind blocker arrangement, where a material web can be deployed in a fan-like manner.

A further wind blocker arrangement can be seen in German patent document DE 41 19 529 A1, where the material web is mounted on extendable rollover safety bars, in such a manner that the material web is tensioned by the extension of the rollover safety bars and thereby activates the wind blocker automatically. Extended rollover safety bars are however not often desired during the drive operation due to aesthetic aspects.

One object of the present invention is to provide an improved embodiment of a wind blocker arrangement such as mentioned at the outset, which simplifies the activation and deactivation of the wind blocker and/or eases or improves the integration of the wind blocker arrangement into the vehicle.

This and other objects and advantages are achieved by the wind blocker arrangement according to the invention, in which the lateral arms are drive-coupled to the bow in such a manner that the bow is driven to extend or wind up the material web by pivoting the arms. This design has several advantages. The drive-coupling of the bow to both arms leads to a closed carrier frame for the material web, which is supported in itself, which increases the stability of this frame and thus of the activated wind blocker. This design enables a simplified activation of the wind blocker at the same time. For example, at least one of the arms can be spring-loaded in its pivoting open direction, or can be driven with the help of a corresponding servo drive. An automatic extension of the wind blocker can for example be realized hereby.

According to an advantageous embodiment, the respective arm can be coupled to the frame drive via a coupling lever. Said coupling lever is then mounted in a pivotal manner on the respective arm on the one hand and on the bow on the other hand respectively transversely to the rotational axis of the shaft. The arms can pivot below the bow during lowering or retracting of the wind blocker by means of this design, the bow extending over the entire width of the material web. At the same time, the use of such a coupling lever enables a reliable forced coupling between the arm and the bow, which can be realized in a comparatively cost-effective manner.

According to a preferred embodiment, the wind blocker arrangement can have a servo drive for driving the arms. The activation and deactivation of the wind blocker can thereby be additionally simplified. A control can be provided in particular, which is designed in such a manner that it accesses the servo drive for pivoting the arms in or out, that is for deactivating or activating the wind blocker in dependence on a vehicle speed. When a predetermined limit speed is exceeded, for example 30 km/h, the control effects an automatic activation of the wind blocker, while it automatically deactivates the wind blocker when the limit speed is fallen below.

Other objects, advantages and novel features of the present invention will become apparent from the following detailed description of the invention when considered in conjunction with the accompanying drawings.

DETAILED DESCRIPTION OF THE DRAWINGS

Figure 1:
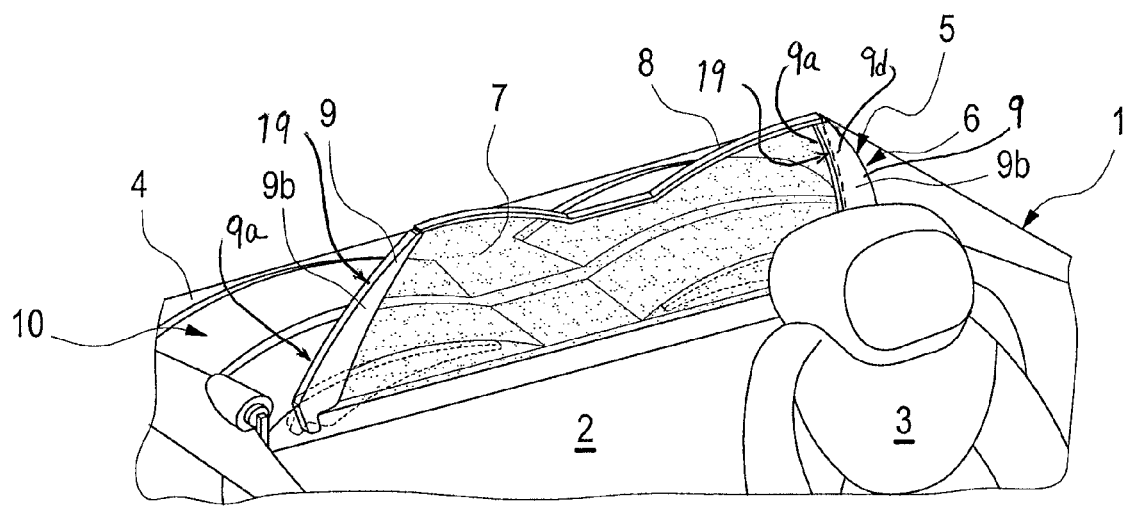
FIG. 1 is a perspective view of a convertible passenger motor vehicle with an activated wind blocker.

A convertible passenger motor vehicle 1 (shown only partially), has an interior space 2 according to FIG. 1 with a front space, not designated in detail. Two seats 3 are in the front space, namely a driver's seat and a passenger seat, of which only one is shown here. Only storage space is present in the back space with a two-seat convertible, whereas a four-seat convertible has two further seats or a seating bench here. The back space only forms a storage for luggage and the like in the example. The representations show the convertible with an open roof. The roof is thereby accommodated in a rear space, which is attached to the back space, and which is closed by a rear space cover 4.

Figure 2:
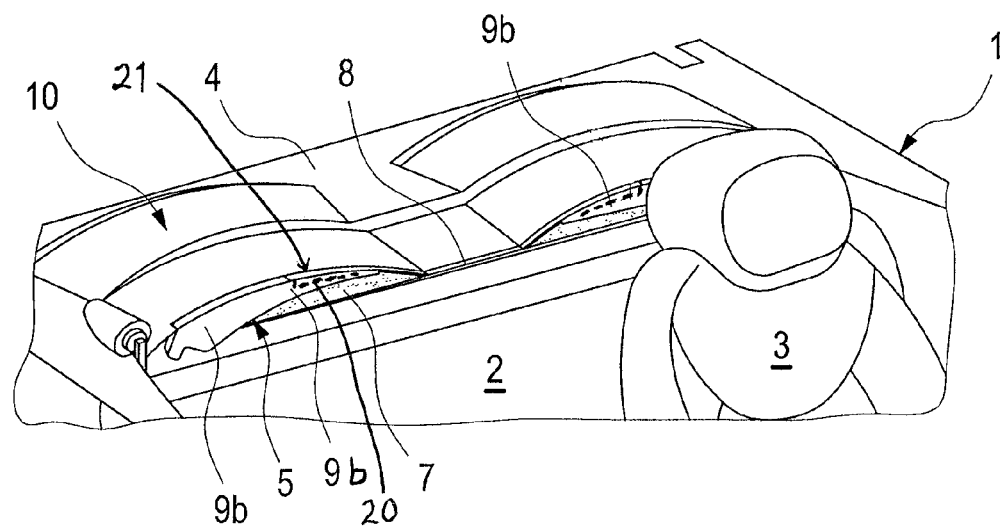
FIG. 2 is a perspective view as in FIG. 1, but with a deactivated wind blocker.
Figure 8:
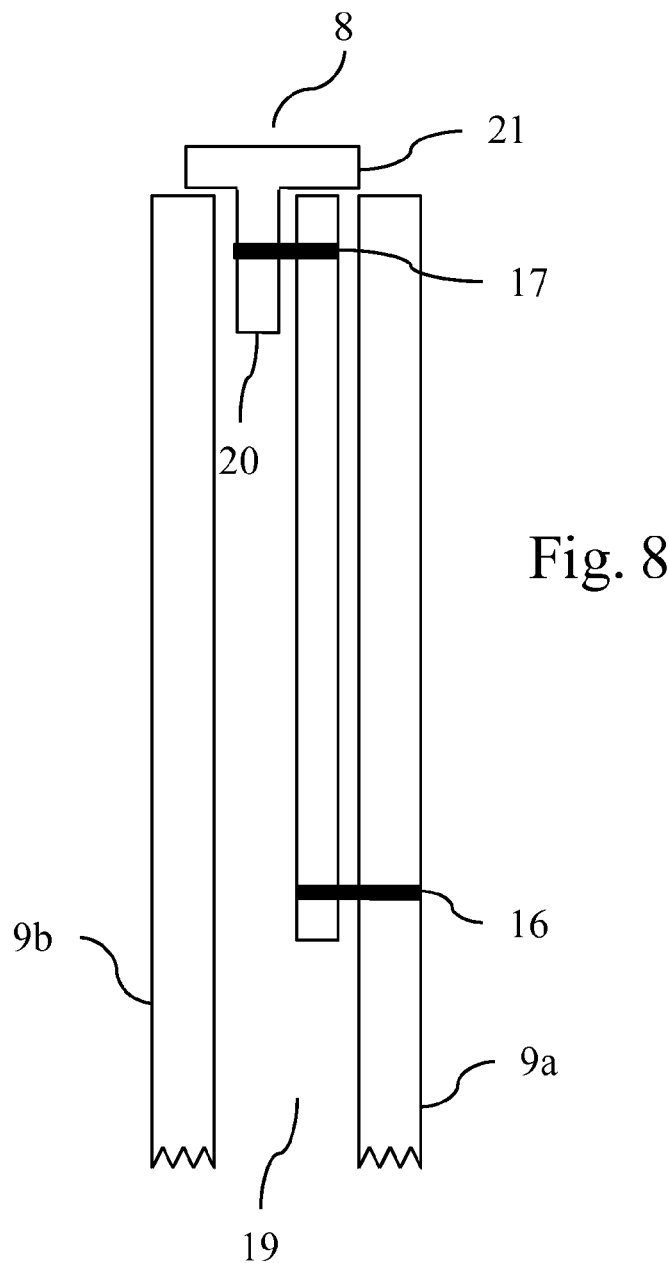
FIG. 8 is a side view of the wind blocker arrangement.

The vehicle 1 is equipped with a wind blocker arrangement 5 in the region of the back space. This is shown in FIG. 1 in an activated state and in FIG. 2 in a deactivated state. The wind blocker arrangement 5 forms a wind blocker 6 in the activated state, which extends in the back space in a plane extending transversely to the longitudinal vehicle direction and thereby impedes a backflow of air from the rear to the front region. The wind blocker 6 is thereby formed by a material web 7, which is framed by a bow 8 arranged at the top and arms 9 arranged laterally. (As discussed in greater detail hereinafter and as illustrated in FIG. 8, each such arm 9 may be formed by two parallel sections 9a and 9b, with an intermediate space 19 formed therebetween.) The wind blocker 6 or the wind blocker arrangement 5 is integrated into the adjacent contour of the vehicle 1 in the deactivated state.

The vehicle 1 is equipped with a back space cover 10 in the shown example, which covers the back space at the top. The back space cover 10 is preferably arranged at the rear space cover, in a pivotable manner, around a transverse vehicle axis, so as to possibly ease an access to the storage in the back space. The back space cover 10 can be adapted to the contour of adjacent regions of the vehicle 1 with regard to its contour, as for example a rear lid. The wind blocker arrangement 5 is integrated into the back space cover 10 in the shown example. The wind blocker arrangement 5 is especially integrated into the contour of the back space cover with regard to its form in its deactivated state. Alternatively, an embodiment is also conceivable, in which the wind blocker arrangement 5 is integrated directly into the vehicle 1, especially in the rear space cover 4. Alternatively, an embodiment is also conceivable, where the wind blocker arrangement 5 forms an autonomous unit, which can be built into the vehicle subsequently and can be removed therefrom. A fixedly built-in embodiment is however preferred, especially the fixed integration of the wind blocker arrangement 5 into the back space cover 10, which itself can be equipped so as to be easily built in or removed.

According to FIGS. 3 to 6, the wind blocker arrangement 5 comprises a roller device 11, which has a shaft 12 and the material web 7 which can be wound onto the shaft. The shaft is arranged rotatably around a rotational axis 13, which extends transversely to the longitudinal vehicle direction and essentially horizontally. The shaft 12 can in particular be coupled to a spring, not shown here, which pretensions the shaft 12 in the roll-up direction. The material web 7 is preferably a net.

The bow 8 is adapted in its form to the outer contour of the vehicle part which is arranged adjacent to the bow 8 when the wind blocker arrangement 5 is deactivated. In the example, the contour of the bow 8 thus corresponds to the contour of the back space cover 10. The bow 8 forms the upper closure of the material web 7. The material web 7 is fastened to the bow 8 over the entire length of the bow 8. The material web 7 can be unwound from the shaft 12 by pulling at the bow.

The wind blocker arrangement 5 further comprises the two lateral arms 9, which are mounted pivotable transversely to the rotational axis 13 of the shaft 12 and which are arranged in the region of lateral edges 14 of the material web 7 when the material web 7 is extended. The arms 9 are drive-coupled to the bow 8, namely in such a manner that a pivoting of the arms 9 inevitably drives the bow 8 for extending or for rolling up the material web 7. In other words, the bow is inevitably moved by an active pivoting of at least one of the arms 9, whereby the bow inevitably rolls the material web onto the shaft 12 or unwinds it therefrom.

Figure 3:
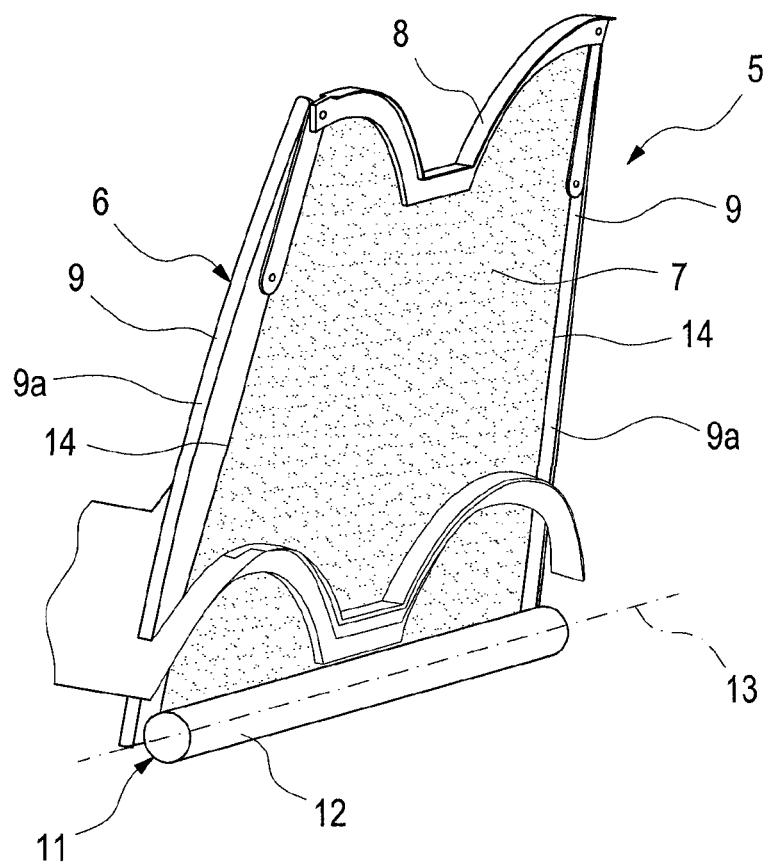
FIG. 3 is a perspective view of a wind blocker arrangement.
Figure 4:
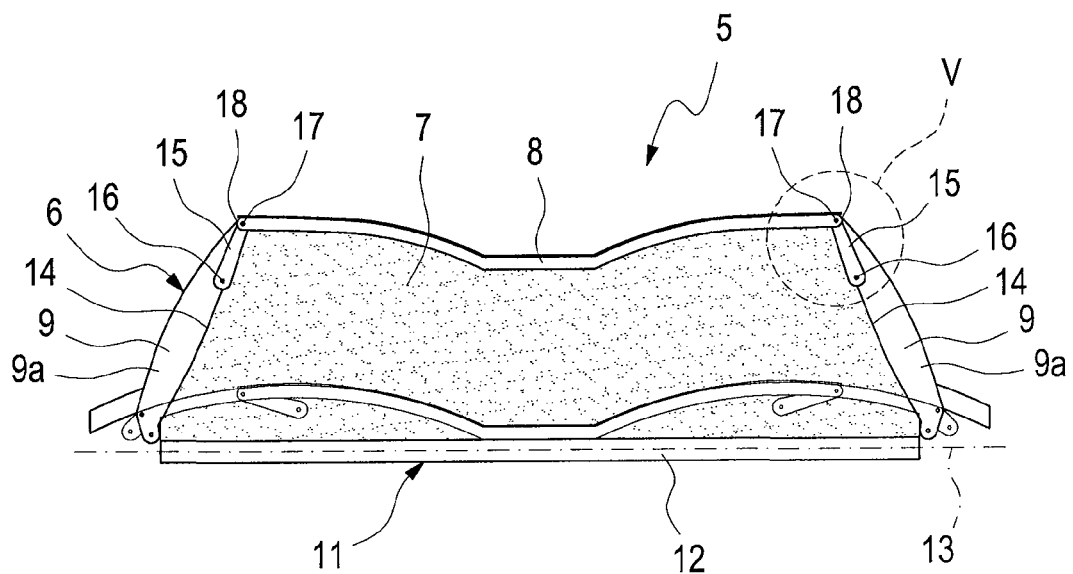
FIG. 4 is a front view of the wind blocker arrangement.
Figure 5:
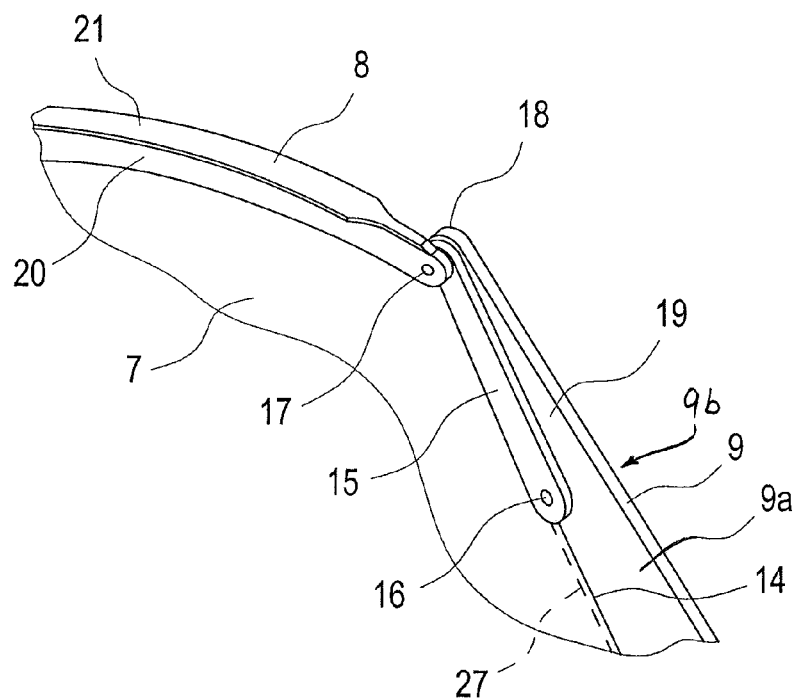
FIG. 5 is a perspective view of a detail V in FIG. 4 of the wind blocker arrangement.
Figure 6:
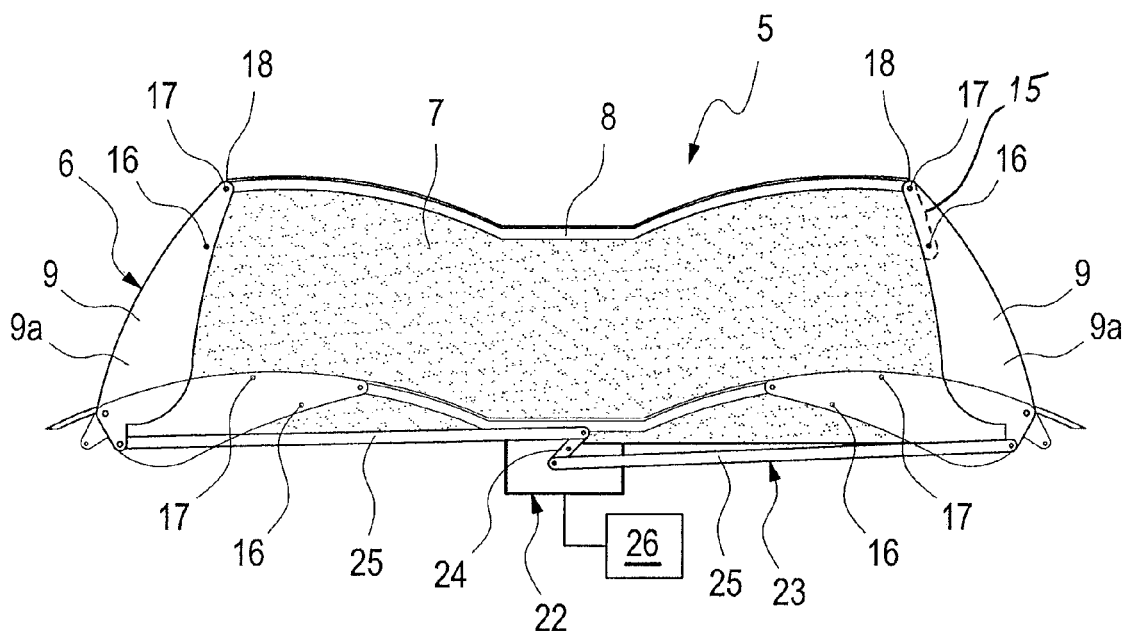
FIG. 6 is a view as in FIG. 4, but in the opposite line of vision.

According to FIGS. 4 to 6, the wind blocker arrangement 5 has a coupling lever 15 per arm 9 for the drive-coupled forced coupling between the arms 9 and the bow 8. The respective coupling lever is mounted pivotable transversely to the rotational axis 13 of the shaft 12 at one end at 16 at the respective arm 9 and at the other end at 17 at the bow 8. With a completely extended wind blocker 6, the ends of the respective arm 9, of the bow 8, and the associated coupling lever 15, which are above each other or behind each other or adjacent to each other, form a common edge 18 of the wind blocker 6. When the windblocker 6, is retracted, as shown in FIGS. 3, 4 and 6, a kinematics results between the arms 9 and the bow 8 by means of the coupling lever 15. This kinematics effects, when lowering the wind blocker 6, that the two arms 9 pivot inwards around their respective pivot axis, that is, towards each other, while the coupling levers 15 simultaneously pivot outwards around their bearing on the arm side 16, that is, away from each other in the same measure. The frame 8 can hereby be moved transversely downwards without pivotal movement, that is parallel to itself, in the direction of the shaft 12. The material web can hereby be wound onto the shaft, which thereby moves around its rotational axis 13. This rollup movement preferably takes place supported by the spring force. At the same time, the spring load of the shaft 12 effects a stabilization of the frame construction formed by the arms 9, the coupling levers 15 and the bow 8 by means of the material web 7.

While the bow-side bearing 17 with an activated wind blocker 6 is further inside with regard to the vehicle center than the bearing 16 on the arm side, it is further out in the deactivated position.

Figure 7:
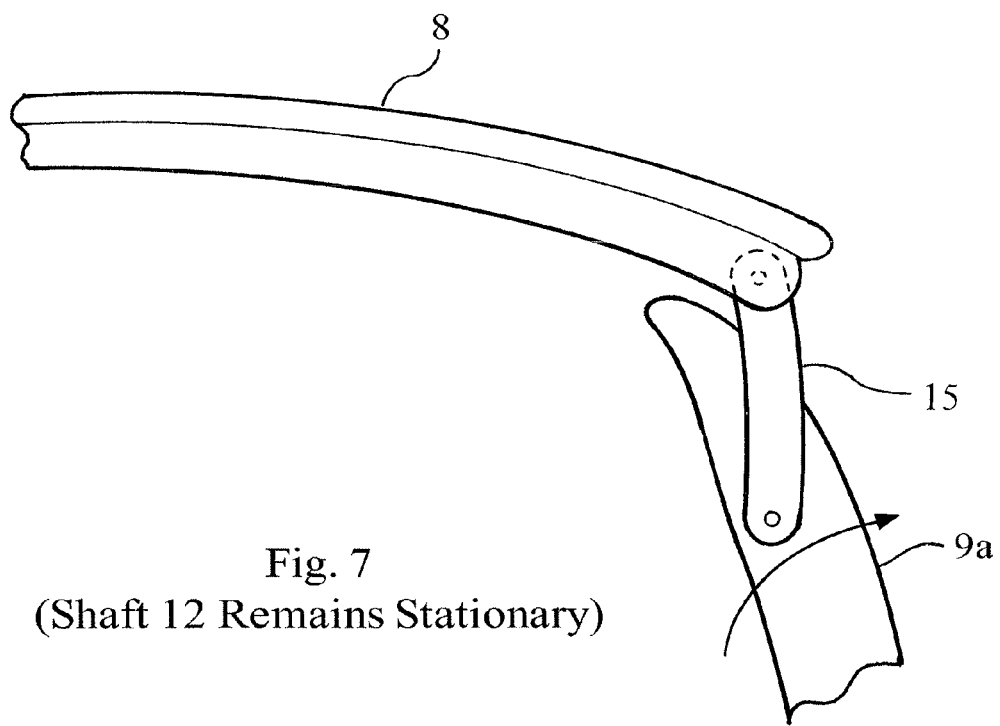
FIG. 7 is a front view of detail V in FIG. 4 illustrating a point before the arms reach their pivoted open end position.

In an advantageous embodiment and as illustrated in FIG. 7, in order that the material web 7 is tensioned in the vertical direction when the wind blocker 6 is activated, the material web 7, the shaft 12 and the arms 9 are adjusted to each other, such that the shaft 12 remains stationary when activating the wind blocker 6, that is when extending the material web 7, even before the arms 9 reach their pivoted open end position. A corresponding tension can hereby be introduced in the vertical direction into the material web 7. It is obvious that the material web 7 comprises a corresponding length and elasticity for this.

According to an advantageous embodiment, the material web 7 can be tailored at its lateral edges 14 in such a manner that the outer edges 14 have a contour which is concave to the outside when the material web 7 is extended. The material web 7 can further respectively have a tensioning element 27 in the region of the respective lateral edge 14, shown in FIG. 5 by a dashed line, at which tensioning element the material web is fixed in the region of its lateral edge. The tensioning element 27 can for example be formed by a cord or a strap, which is incorporated into the material web 27 in a suitable manner. When the arms 9 are pivoted open, this tensioning element 27 is tensioned in its longitudinal direction, whereby the radius of the concave outer contour is increased, which results in the introduction of a horizontally oriented tension in the material web 7. It is achieved hereby that the material web 7 is also tensioned in the horizontal direction in the activated state.

As noted previously and as illustrated in FIG. 8, the arms 9 can respectively have two sections 9a and 9b parallel to each other. FIGS. 3, 4 and 6 respectively only show the section 9a. In FIGS. 3 to 4, the section 9b is omitted for a better understanding. The two sections 9a, 9b extend parallel to each other and form an intermediate space 19 therebetween. As shown by the dashed line 9d in FIG. 1, material web 7 immerses into this intermediate space 19 during the extension, namely in the region of its respective lateral edge 14. Hereby, no gap results laterally between the respective arm 9 and the respective lateral edge when the wind blocker is activated. The two sections 9a, 9b can for example be formed by two flanges which can simultaneously pivoted around the pivot axis of the arm 9, which together form the respective arm 9 and are fastened to each other by a distance body, not shown. The intermediate space 19 can also be formed by a recess in the arm 9, whereby the two parallel sections 9a and 9b result.

The intermediate space 19 is conveniently dimensioned in such a manner that the respective coupling lever 15 can be arranged in the intermediate space 19, as shown in FIG. 6. The aesthetics of the wind blocker 6 is hereby improved on the one hand. On the other hand, the stability of the wind blocker 6 increases in the activated state, as the coupling lever 15 and the respective end of the bow 8 is then arranged in the intermediate space 19 between the two sections 9a and 9b and is thereby stabilized with regard to its position.

According to FIGS. 5 and 8 the bow 8 can for example have a T profile with a longitudinal leg 20 projecting downwards and a transverse leg 21 limiting the longitudinal leg 20 at the top and projecting on both sides. When the wind blocker is deactivated, that is with a retracted material web 7, the bow 8 with its longitudinal leg 20 can fit into the intermediate space 19 of the respective arm 9. At the same time, the transverse leg 21 can cover the intermediate space 19 from above or overlap it in this pivoted in position of the arms 9. The bow 9 hereby effects a lining of the arms 9 in the deactivated position of the wind blocker 6, whereby an aesthetic integration of the wind blocker arrangement 5 for its deactivated state into the remaining environment of the vehicle is realized, here especially in the rear space cover 10.

According to FIG. 6, the wind blocker arrangement 5 is equipped with a servo drive 22 in a preferred embodiment, which drives the two arms 9 via a linkage 23. Rods 25 can be driven by rotating a rocker lever 24, which rods are coupled to the arms 9 and effect a pivoting of the arms 9. The servo drive 22 is preferably an electric motor and can have a transmission.

A control 26 can be provided for actuating the servo drive 22, with the help of which the wind blocker 6 can be activated and deactivated automatically. The control 26 thereby controls the servo drive 22 in dependence on a vehicle speed. When a predetermined and especially manually adjustable limit speed is exceeded, which can for example be 30 or 50 km/h, the control 26 automatically effects an activation of the wind blocker 6. When this limit speed is fallen below, the control 26 effects an automatic deactivation of the wind blocker 6. Additionally or alternatively, an arbitrary or manually actuatable switch can be provided, with which the servo drive 22 can be accessed for activating and deactivating the wind blocker 6.

The back space cover 10 can partially be provided with small openings, for example in the form of a grate, through which a diffuse air flow can enter the back space. The negative pressure in the interior 2 can hereby also be reduced, which supports the wind blocker function.

The possibility of a particularly comfortable operation, which is especially supported by a motor and which preferably can take place automatically is particularly advantageous with the wind blocker arrangement 5 suggested here. The accommodation in the back space cover 10 is further particularly advantageous, as the wind blocker arrangement 5 can then be pivoted up together with the back space cover 10, for example to enable the access to the back space. The suggested wind blocker arrangement 5 is further distinguished by its particularly compact design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wind blocker arrangement for a convertible passenger motor vehicle, said wind blocker arrangement comprising:
    a roller device having a shaft and a material web that may be rolled onto the shaft;
    a bow to which the material web is attached and by which the material web may be unwound from the shaft;
    lateral arms that, when the material web is extended, are disposed in a region of lateral edges of the material web, and that are pivotable about an axis that is perpendicular to a rotational axis of the shaft; wherein,
    the arms are drive-coupled to the bow such that pivoting the arms open causes the bow to pull out the material web; and
    the material web, the shaft and the arms are adjusted to each other in such a manner that, when the material web is pulled out, the shaft remains stationary at a point before the arms reach their pivoted open end position.

2. The wind blocker arrangement according to claim 1, wherein each respective arm is drive-coupled to the bow via a coupling lever, which is mounted pivotably, about an axis that is perpendicular to a rotational axis of the shaft at the respective arm, and at the bow.

3. The wind blocker arrangement according to claim 1, wherein:
    lateral edges of the material web have a section which is concave to the outside; and
    a tensioning element arranged in the region of the lateral edges is tensioned when the arms are pivoted open.

4. The wind blocker arrangement according to claim 1, wherein a servo drive is provided for driving the arms.

5. The wind blocker arrangement according to claim 4, wherein a control for the vehicle speed dependent access of the of the servo drive is provided for pivoting the arms in and out.

6. A wind blocker arrangement for a convertible passenger motor vehicle, said wind blocker arrangement comprising:
    a roller device having a shaft and a material web that may be rolled onto the shaft;
    a bow to which the material web is attached and by which the material web may be unwound from the shaft;
    lateral arms that, when the material web is extended, are disposed in a region of lateral edges of the material web, and that are pivotable about an axis that is perpendicular to a rotational axis of the shaft; wherein, the arms are drive-coupled to the bow such that pivoting the arms open causes the bow to pull out the material web;

each respective arm has two sections parallel to each other, between which is formed an intermediate space; and the material web, in the region of its respective lateral edge, recedes into the intermediate space when the material web is pulled out.

7. The wind blocker arrangement according to claim 6, wherein the coupling lever is arranged in the intermediate space of the respective arm.

8. The wind blocker arrangement according claim 6, wherein the bow covers the intermediate space when the material web is rolled up, with the respective arm pivoted into its pivoted in position.

9. The wind blocker arrangement according to claim 6, wherein the bow recedes at least partially into the intermediate space when the material web is rolled up, with the respective arm pivoted into its pivoted in position.

10. A passenger motor vehicle comprising:
a vehicle body having a convertible configuration; and
a wind blocker arrangement coupled to said vehicle body, said wind blocker arrangement comprising,
a roller device having a shaft and a material web that may be rolled onto the shaft;
a bow to which the material web is attached and by which the material web may be unwound from the shaft;
lateral arms that, when the material web is extended, are disposed in a region of lateral edges of the material web, and that are pivotable about an axis that is perpendicular to a rotational axis of the shaft; wherein,
the arms are drive-coupled to the bow such that pivoting the arms open causes the bow to pull out the material web; and
the material web, the shaft and the arms are adjusted to each other in such a manner that, when the material web is pulled out, the shaft remains stationary at a point before the arms reach their pivoted open end position.

\* \* \* \* \*